(12) United States Patent
Kunigk

(10) Patent No.: US 9,216,782 B2
(45) Date of Patent: Dec. 22, 2015

(54) TRACKED RUNNING GEAR

(75) Inventor: Martin Kunigk, Dortmund (DE)

(73) Assignee: Caterpillar Global Mining HMS GmbH, Dortmund (DE)

( * ) Notice: Subject to any disclaimer, the term of this patent is extended or adjusted under 35 U.S.C. 154(b) by 188 days.

(21) Appl. No.: 14/001,626

(22) PCT Filed: Feb. 22, 2012

(86) PCT No.: PCT/DE2012/000167
§ 371 (c)(1),
(2), (4) Date: Sep. 13, 2013

(87) PCT Pub. No.: WO2012/116674
PCT Pub. Date: Sep. 7, 2012

(65) Prior Publication Data
US 2013/0342006 A1    Dec. 26, 2013

(30) Foreign Application Priority Data

Mar. 1, 2011  (DE) .......................... 10 2011 012 711

(51) Int. Cl.
| | |
|---|---|
| B62D 55/08 | (2006.01) |
| B62D 55/12 | (2006.01) |
| B62D 55/125 | (2006.01) |
| B62D 55/14 | (2006.01) |

(Continued)

(52) U.S. Cl.
CPC ............... *B62D 55/08* (2013.01); *B62D 55/12* (2013.01); *B62D 55/125* (2013.01); *B62D 55/14* (2013.01); *B62D 55/202* (2013.01); *B62D 55/26* (2013.01)

(58) Field of Classification Search
CPC ........ B62D 55/08; B62D 55/12; B62D 55/18; B62D 55/114

USPC ......... 305/142, 196, 201, 103, 203, 202, 198, 305/115, 137, 193, 171
See application file for complete search history.

(56) References Cited

U.S. PATENT DOCUMENTS

| | | | | |
|---|---|---|---|---|
| 3,359,044 A | * | 12/1967 | Boggs ........................... | 305/201 |
| 3,603,650 A | * | 9/1971 | Miller .......................... | 305/137 |
| 4,175,796 A | * | 11/1979 | Boggs et al. .................. | 305/115 |

(Continued)

FOREIGN PATENT DOCUMENTS

| | | |
|---|---|---|
| CN | 1174791 | 3/1998 |
| CN | 1176624 | 3/1998 |

(Continued)

OTHER PUBLICATIONS

International Search Report for International Application No. PCT/DE2012/000167, dated Jul. 6, 2012, 2 pages.

*Primary Examiner* — Hau Phan

(57) ABSTRACT

A tracked running gear includes a drive sprocket having two sides and laterally projecting tooth profiles on both sides; a guide wheel, at least one track roller, at least one support roller, and an endless chain formed by ground plates interconnected in an articulated manner. The ground plates have vertically extending parallel teeth which engage the tooth profiles on both sides of the drive sprocket as the ground plates are diverted around the drive sprocket. The ground plates also include a first running surface having a substantially rectilinear form between the teeth for engaging the track roller and support roller, and second running surfaces having a curved form and arranged on opposite sides of the first running surface and between the teeth for engagement with the guide wheel and the drive sprocket.

19 Claims, 5 Drawing Sheets

(51) Int. Cl.
  *B62D 55/20* (2006.01)
  *B62D 55/26* (2006.01)

(56) References Cited

U.S. PATENT DOCUMENTS

| | | | | |
|---|---|---|---|---|
| 4,176,887 A | * | 12/1979 | Alpers et al. | 305/196 |
| 5,636,911 A | | 6/1997 | Korpi | |
| 5,829,849 A | * | 11/1998 | Lawson | 305/193 |
| 6,074,023 A | * | 6/2000 | Satou et al. | 305/116 |
| 6,454,366 B1 | * | 9/2002 | Egle | 305/202 |
| 6,474,755 B1 | * | 11/2002 | Pringiers | 305/171 |
| 7,347,513 B2 | * | 3/2008 | Johannsen et al. | 305/203 |
| 7,766,433 B2 | * | 8/2010 | Mulligan et al. | 305/103 |
| 8,070,241 B2 | * | 12/2011 | Mulligan | 305/196 |
| 8,540,325 B2 | * | 9/2013 | Diekevers et al. | 305/198 |
| 8,613,486 B2 | * | 12/2013 | Johannsen et al. | 305/201 |

FOREIGN PATENT DOCUMENTS

| | | |
|---|---|---|
| CN | 2281931 | 5/1998 |
| CN | 101402376 | 4/2009 |
| DE | 27 20 332 | 11/1978 |
| DE | 198 32 637 | 1/2000 |
| DE | 199 20 025 | 11/2000 |
| DE | 101 13 412 | 10/2002 |

\* cited by examiner

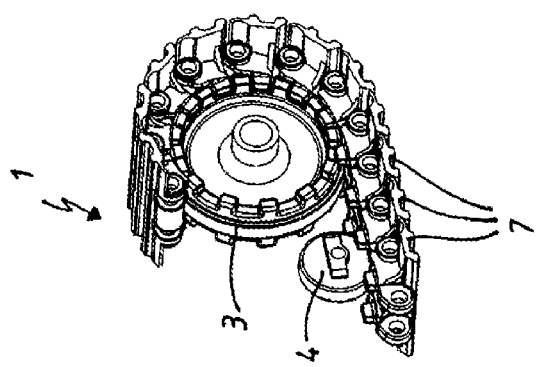
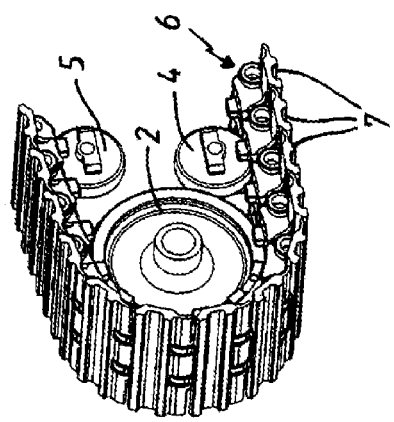
Fig. 1

TRACKED RUNNING GEAR

CROSS-REFERENCE TO RELATED APPLICATIONS

This application claims the benefit of priority to international patent application number PCT/DE2012/000167, having a filing date of Feb. 22, 2012, which claims the benefit of priority to German patent application number DE102011012711.9, having a filing date of Mar. 1, 2011, the complete disclosures of which are hereby incorporated by reference for all purposes.

TECHNICAL FIELD

The invention relates to a tracked running gear, in particular for excavators with a service weight of >200 t.

BACKGROUND

DE 27 20 332 A1 discloses a tracked running gear for vehicles, in particular hydraulic excavators, provided with a dedicated drive, the tracked running gear having a drive sprocket, a guide wheel for the diversion of the track chain, and chain links which are interconnected by means of bolts. Of importance in said document is the fact that two-web chain links are disclosed which are manufactured from one piece and which are configured such that the chain links have a centrally arranged cam, the outer planar surfaces of which are engaged on, for the purpose of driving the chain, by the teeth situated centrally on the drive sprocket.

The chain links each have inner and outer lugs in which the bolts for connecting the individual chain links to form a chain strand are received, wherein the receiving inner and outer lugs are arranged below the running surfaces of the chain links.

DE 199 20 025 C2 has disclosed a tracked running gear, in particular for cranes, composed of multiple track rollers, at least one drive sprocket, and an endless chain formed from a multiplicity of articulatedly interconnected ground plates, wherein each chain link has two guide webs which are arranged symmetrically with respect to the center and with a spacing to one another and which lie in the running direction. The top side of said guide webs has a concavely curved support surface which interacts with the convexly curved running ring surface of the drive sprocket. The outer sides of the respective guide webs serve for lateral guidance between the track rollers, and the inner sides of the respective guide webs serve for guiding the drive sprocket. The chain teeth of the drive sprocket engage, for the purpose of driving the chain, into an opening provided centrally in the chain links.

Tracked running gears that are used in practice are subject to wear as a result of elongation of the chain links and metallic contact between the track roller and ground plate running surface and between the sprocket and ground plate running surface, wherein, over its service life, the drive sprocket is flattened into a polygonal shape. Progressive wear leads to geometric displacements which cause the ground plate teeth to override the teeth of the drive sprocket, thus leading to failure of the running gear.

In modern tracked running gears, two concepts are realized:
- the so-called single path solution, wherein a common running surface is provided for track rollers and support rollers and also for drive sprocket and guide wheel;
- the so-called double-path solution, wherein two common running surfaces are provided for running rollers and support rollers and also for drive sprocket and guide wheel.

Both variants have advantages, but similarly have negative aspects with regard to the wear discussed above.

The invention is based on the object of providing a tracked running gear, in particular for excavators having a service weight of >200 t, which tracked running gear is, in relation to the prior art used hitherto, distinguished by an increased service life through a reduction in wear of individual running gear components, such as chain links, drive sprocket or the like.

SUMMARY

Said object is achieved by means of a tracked running gear, in particular for excavators having a service weight of >200 t, having a drive sprocket, having a guide wheel, having multiple track rollers, having multiple support rollers and having an endless chain formed by a multiplicity of ground plates interconnected in an articulated manner, wherein the drive sprocket is provided with laterally projecting tooth profiles and the ground plates are provided with vertically extending teeth which run parallel to one another, which teeth engage into the tooth profiles as the ground plates are diverted around the drive sprocket, wherein the ground plates form separate running surfaces between the teeth firstly for the track rollers and support rollers and secondly for the guide wheel and the drive sprocket, in such a way that the running surface for the track rollers and support rollers is of substantially rectilinear form and the running surfaces for the guide wheel and the drive sprocket are of curved form.

Advantageous refinements of the subject matter of the invention are further described herein.

With the subject matter of the invention, for the predefined construction, a technique is provided by which the wear of the running surfaces for the track rollers and support rollers no longer has an influence on the engagement geometry between ground plates and drive sprocket.

The curvature of the running surfaces for the guide wheel and the drive sprocket is formed correspondingly to the radius of the guide wheel and of the drive sprocket. As a result of said measure, the undesired polygon effect, which has a large influence on the overall wear and thus on the length of the service life of the running gear, during the diversion of the chain around the drive sprocket is eliminated.

As a result of the spatial separation of the running surfaces on the ground plate, the wear behavior of the running gear components is positively influenced, and thus the service life of the running gear is increased. Of the three factors that influence the service life of the tracked running gear (elongation of the chain, metallic contact between track roller and ground plate, metallic contact between drive sprocket and ground plate), the separation of the running surfaces on the ground plate firstly reduces the wear between drive sprocket and ground plate running surfaces. Secondly, by means of the separation, it is ensured that the wear on the separate running surface for the track rollers and support rollers does not influence the geometry between the ground plate and drive sprocket. This means that the wear on the track roller running surface does not reduce the gap between the running-in sprocket tooth and the ground plate.

In relation to DE 199 20 025 C2, the tracked running gear according to the invention firstly has a different structural design and secondly has a different arrangement of the running surfaces. The tooth engagement for the purpose of driving the chain takes place in an areally deriailing manner by means of cams which form tooth profiles and which are arranged laterally on the drive sprocket, specifically on the outside of the drive sprocket to the right and to the left, whereas the track rollers and support rollers are guided, in a single-path configuration, centrally on that surface of the ground plates which runs rectilinearly in the direction of travel. In relation to rather static crane operation, said arrangement has the advantage in the case of excavator operation that, when the excavator performs travelling movements in a mining facility, unevennesses in the ground to be travelled over can be better compensated. An oblique position of the ground plates, for example as a result of a rock being travelled over edgewise, is compensated by the single-path track roller, without an immediate stress peak occurring at the outer edges of the running surface for the track rollers. Said compensation is not provided in the case of the known tracked running gear. In the latter case, in the event of an oblique position, the bearing arrangement of the track rollers would rather be subject to extreme loading, leading to premature failure of the components. As a result of the narrow construction of the track roller of the tracked running gear according to the invention, the bending stresses in the track roller axle and in the bearing arrangement thereof are reduced. Furthermore, in relation to DE 199 20 025 C2, said arrangement of the functional surfaces eliminates loads in the connecting region of the ground plates, because the track rollers are guided between the chain links and thus the operational loads cannot be transmitted to the joint connections.

According to a further concept of the invention, the running surface for the track rollers and support rollers is situated between the running surfaces for the guide wheel and the drive sprocket.

BRIEF DESCRIPTION OF THE DRAWINGS

The subject matter of the invention is illustrated in the drawing, and described in the following text, on the basis of an exemplary embodiment. In the drawing:

FIG. 1 shows a diagrammatic sketch of the tracked running gear according to the invention;

DETAILED DESCRIPTION

Figure 2:
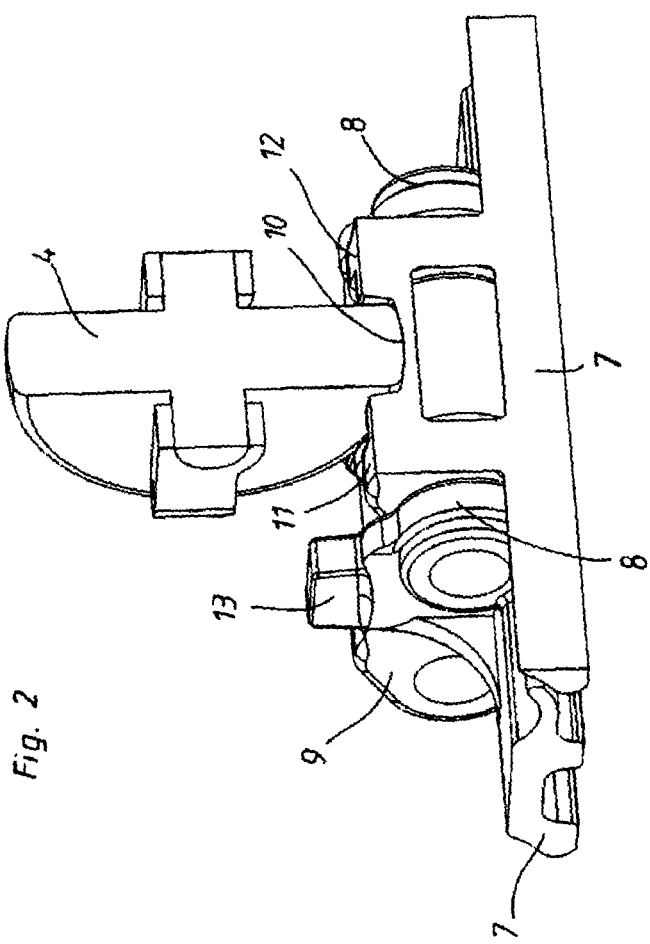
FIG. 2 is an illustration of ground plates that are operatively connected to a track roller.

FIG. 1 shows, in a perspective illustration, a diagrammatic sketch of the tracked running gear 1 according to the invention. The following components can be seen: a guide wheel 2, a drive sprocket 3, track rollers 4, support rollers 5 and an endless chain 6 formed from a multiplicity of articulatedly interconnected ground plates 7.

FIG. 2 shows ground plates 7 which are operatively connected to a track roller 4. It is possible to see the connecting regions 8, 9 for accommodating further ground plates 7. It can be seen in said figure that the track roller 4 rolls on an associated running surface 10 which is provided with a rectilinearly running contour. Provided outside the running surface 10 for the track and support rollers 4, 5, that is to say above the running surface 10, are further running surfaces 11, 12. The ground plates 7 are provided with chain teeth 13 which, as the chain is diverted around the drive sprocket 3 (FIG. 1), engage into corresponding tooth profiles (FIG. 3) provided on the drive sprocket 3. Here, the running surface 10 runs rectilinearly, whereas the running surfaces 11, 12 are of curved form.

Figure 3:
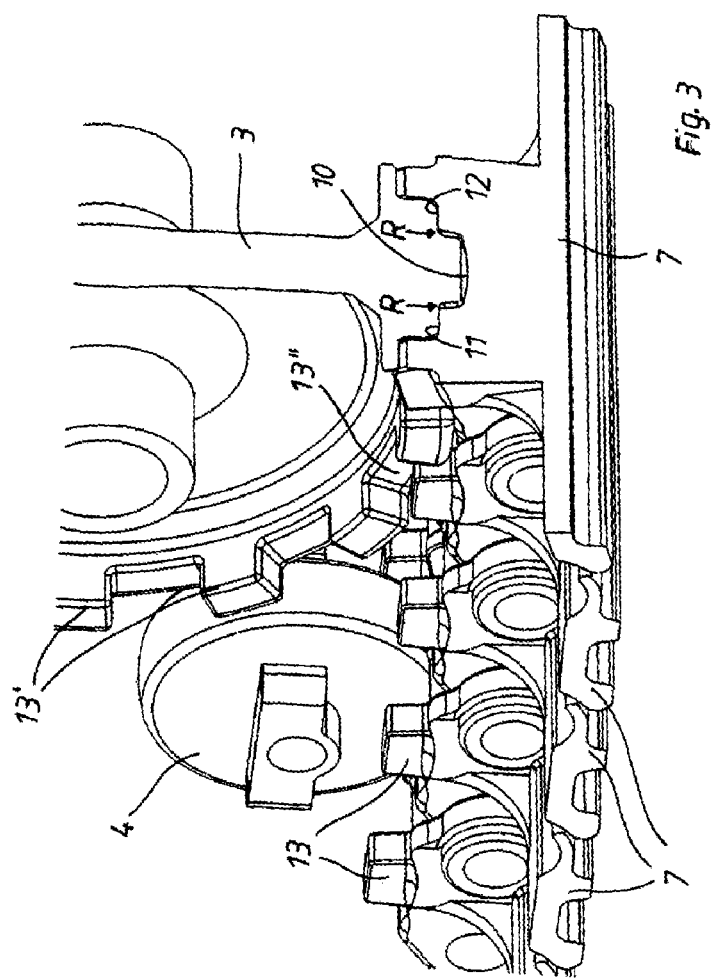
FIG. 3 is a partial illustration of the drive region of the tracked running gear as per FIG. 1.

FIG. 3 shows, in the form of a partial illustration, the drive sprocket 3 with a track roller 4 positioned in front. Multiple ground plates 7 can be seen. The drive sprocket 3 is supported not on the running surface 10 provided for the track roller 4 but rather on the further running surfaces 11, 12, which run in a curved form, of the respective ground plate 7. Spatial separation is thus realized between the running surfaces 10 and also 11 and 12 for the individual components, specifically the track and support rollers 4, 5 and the guide wheel 2 and the drive sprocket 3. It is possible to see the vertically arranged chain teeth 13 on the ground plates 7 and the tooth profile 13' formed on the drive sprocket 3, said tooth profile being formed by teeth (cams) which project laterally beyond the drive sprocket 3. As the ground plates 7 run around the drive sprocket 3, the chain teeth 13 engage into tooth interspaces 13" of the tooth profile 13'. As a result of the running surfaces 11, 12 formed in a curved manner corresponding to the radius R of the drive sprocket 3, polygon effects during the diversion of the ground plates 7 are prevented, which has a positive effect on the service life of the individual components of the tracked running gear 1.

Figure 4:
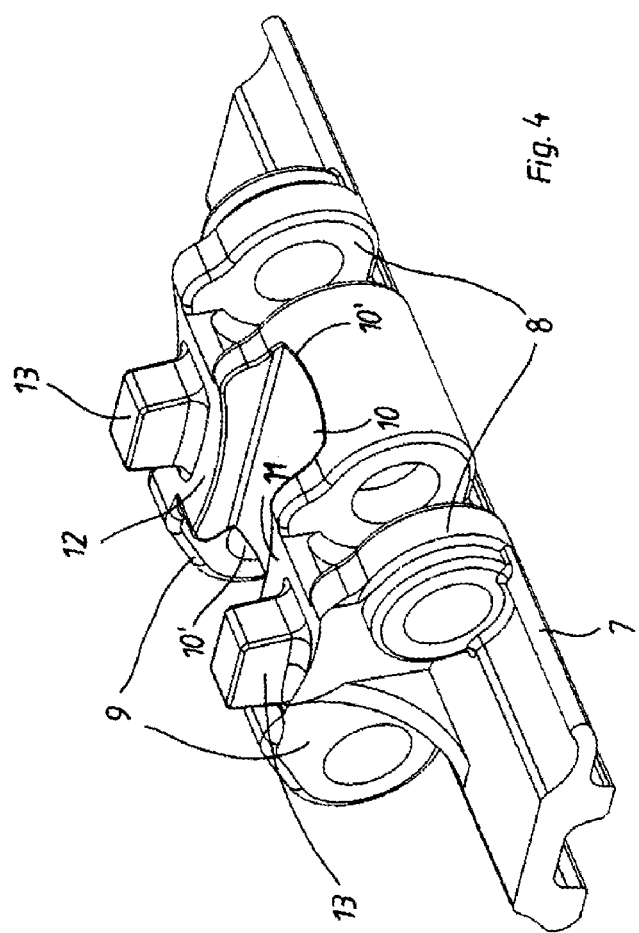
FIG. 4 is an illustration of a single ground plate.

FIG. 4 shows, in the form of an individual illustration, a ground plate 7 comprising the articulation regions 8, 9, the chain teeth 13, the running surface 10, which runs rectilinearly in the direction of travel, for the track and support rollers not illustrated here, and the running surfaces 11, 12 for the guide wheel 2 and the drive sprocket 3 respectively. The curvature, visible in this figure, of the running surfaces 11 and 12 is intended, according to the invention, to correspond to the radius R of the guide wheel 2 and of the drive sprocket 3 respectively, whereby the polygon effects that have hitherto arisen during the diversion of the ground plates 7 are eliminated. The end regions 10' of the rectilinearly extending running surface 10 may be formed so as to yield, between individual ground plates 7, as small a spacing of the running surfaces 10 as possible (not illustrated). This has the effect that the track rollers 4 and support rollers 5 run over said running surfaces in an optimum manner with low noise.

Figure 5:
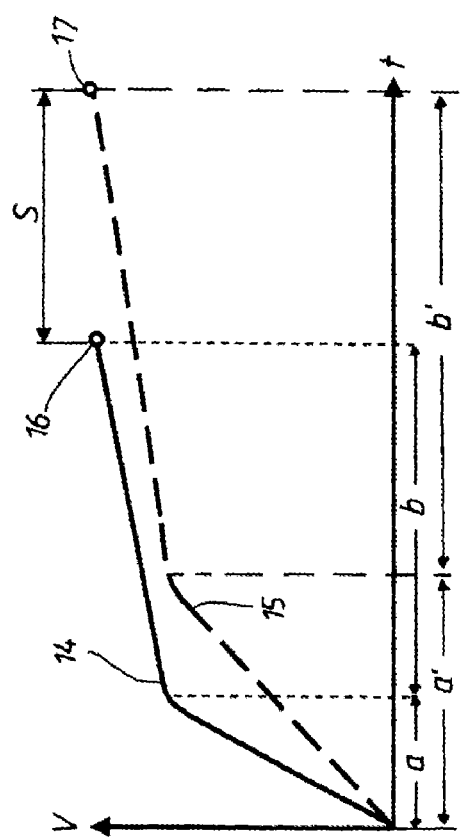
FIG. 5 is a wear diagram.

FIG. 5 shows a wear diagram. The wear V is plotted against the time t. The curve 14 shows the wear behavior, in principle, of a running gear according to the prior art. The curve 15 with dashed lines shows the wear behavior, in principle, according to the invention. It can be seen that the run-in phase a, a' is lengthened in terms of time in the case of the subject matter of the invention. The low wear rate of a' in relation to a results from the elimination of the polygon effect on the drive sprocket and from the separation of the running surfaces for track rollers and drive sprocket and guide wheel respectively. The lengthening of the working phase b' in relation to b arises only as a result of the spatial separation of the running surfaces. After the run-in phase, the polygon effect no longer has an influence. In the case of the prior art as per curve 14, the exchange of a running gear owing to geometric distortion is necessary already when the time point 16 is reached, whereas in the case of the subject matter according to the invention, said time point can be delayed as far as time point 17. The increase in service life S in relation to curve 14 leads to a not inconsiderable reduction in costs for the operation of the tracked running gear 1.

The invention claimed is:
1. A tracked running gear, comprising:
a drive sprocket having a first side and a second side, and having laterally projecting tooth profiles on the first side and the second side;
a guide wheel;
a plurality of track rollers;
a plurality of support rollers;
an endless chain formed by a multiplicity of ground plates interconnected in an articulated manner, the ground plates having two or more vertically extending teeth which run parallel to one another, the teeth engaging the tooth profiles as the ground plates are diverted around the drive sprocket;

the ground plates comprising a first running surface between the teeth for engagement with the track rollers and support rollers, and second running surfaces between the teeth for engagement with the guide wheel and the drive sprocket;

wherein the first running surface for the track rollers and support rollers is of substantially rectilinear form and the second running surfaces for the guide wheel and the drive sprocket are of curved form.

2. The tracked running gear of claim 1, wherein the first running surface and the second running surfaces are arranged between the teeth such that the first running surface for the track rollers and support rollers runs spatially between the second running surfaces for the guide wheel and the drive sprocket.

3. The tracked running gear of claim 2, wherein the second running surfaces for the guide wheel and the drive sprocket are formed by elevated portions.

4. The tracked running gear of claim 1, wherein each of the ground plates comprise connecting regions for coupling of one ground plate to an adjacent ground plate, and wherein the first running surface for the track rollers and support rollers is provided outside of the connecting regions of the ground plates.

5. The tracked running gear of claim 1, wherein a curvature of the second running surfaces is formed correspondingly to a radius of the guide wheel and of the drive sprocket.

6. The tracked running gear of claim 1, wherein the first running surface comprises an end region when the ground plates are operably interconnected, and the end region comprises an overlap portion.

7. A tracked running gear, comprising:
a drive sprocket having a first side and a second side and laterally projecting tooth profiles on the first side and the second side;
a guide wheel;
at least one track roller;
at least one support roller;
an endless chain formed by ground plates interconnected in an articulated manner, the ground plates having vertically extending teeth which engage the tooth profiles on the first side and the second side of the drive sprocket as the ground plates are diverted around the drive sprocket;
the ground plates comprising a first running surface having a substantially rectilinear form between the teeth for engaging the track roller and support roller, and second running surfaces having a curved form and disposed on opposite sides of the first running surface and between the teeth for engagement with the guide wheel and the drive sprocket.

8. The tracked running gear of claim 7, wherein the first running surface and the second running surfaces are arranged between the teeth such that the first running surface for the track rollers and support rollers runs spatially between the second running surfaces for the guide wheel and the drive sprocket.

9. The tracked running gear of claim 8, wherein the second running surfaces for the guide wheel and the drive sprocket are formed by elevated portions.

10. The tracked running gear of claim 7, wherein each of the ground plates comprise connecting regions for coupling of one ground plate to an adjacent ground plate, and wherein the first running surface for the track rollers and support rollers is provided outside of the connecting regions of the ground plates.

11. The tracked running gear of claim 7, wherein a curvature of the second running surfaces is formed correspondingly to a radius of the guide wheel and of the drive sprocket.

12. The tracked running gear of claim 7, wherein the first running surface comprises an end region when the ground plates are operably interconnected, and the end region comprises an overlap portion.

13. An excavator having at least one tracked running gear according to claim 7.

14. A ground plate for a tracked running gear, the running gear including a drive sprocket having a first side and a second side and laterally projecting tooth profiles on the first side and the second side, a guide wheel, at least one track roller, and at least one support roller, the ground plate comprising:
two or more vertically extending teeth that are substantially parallel to one another and configured to mesh with the tooth profiles on the first side and the second side of the drive sprocket;
a first running surface having a substantially rectilinear form between the teeth and configured to engage the track roller and support roller, and second running surfaces having a curved form and disposed on opposite sides of the first running surface and between the teeth and configured to engage the guide wheel and the drive sprocket;
wherein a multiplicity of the ground plates are configured to be interconnected in an articulated manner to form an endless chain disposed about the drive sprocket, guide wheel, track roller and support roller.

15. The ground plate of claim 14, wherein the first running surface and the second running surfaces are arranged between the teeth such that the first running surface for the track rollers and support rollers runs spatially between the second running surfaces for the guide wheel and the drive sprocket.

16. The ground plate of claim 15, wherein the second running surfaces are formed by elevated portions.

17. The ground plate of claim 14, wherein the ground plate further comprises connecting regions for coupling of one ground plate to an adjacent ground plate, and wherein the first running surface for the track rollers and support rollers is provided outside of the connecting regions.

18. The ground plate of claim 14, wherein a curvature of the second running surfaces is formed correspondingly to a radius of the guide wheel and of the drive sprocket.

19. The ground plate of claim 14, wherein the first running surface comprises an end region when the ground plates are operably interconnected, and the end region comprises an overlap portion.

* * * * *